(12) United States Patent
Drew et al.

(10) Patent No.: US 12,230,162 B2
(45) Date of Patent: Feb. 18, 2025

(54) SIMULATION MODEL FOR LAPAROSCOPIC FOREGUT SURGERY

(71) Applicant: Intuitive Surgical Operations, Inc., Sunnyvale, CA (US)

(72) Inventors: Samuel D. Drew, Sunnyvale, CA (US); Robert P. Jury, Durham, NC (US); Richard H. Feins, Sunnyvale, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 807 days.

(21) Appl. No.: 17/494,376

(22) Filed: Oct. 5, 2021

(65) Prior Publication Data
US 2022/0101756 A1     Mar. 31, 2022

Related U.S. Application Data

(63) Continuation-in-part of application No. PCT/US2020/026659, filed on Apr. 3, 2020.
(Continued)

(51) Int. Cl.
*G09B 23/30* (2006.01)
*G09B 23/32* (2006.01)
*G09B 23/34* (2006.01)

(52) U.S. Cl.
CPC ......... *G09B 23/306* (2013.01); *G09B 23/303* (2013.01); *G09B 23/32* (2013.01); *G09B 23/34* (2013.01)

(58) Field of Classification Search
CPC ...... G09B 23/28; G09B 23/30; G09B 23/306; G09B 23/34
See application file for complete search history.

(56) References Cited

U.S. PATENT DOCUMENTS 4,938,696 A   7/1990 Foster et al.
5,792,135 A   8/1998 Madhani et al.
(Continued)

OTHER PUBLICATIONS

International Search Report and Written Opinion issued in counterpart PCT Application No. PCT/US2020/026659 dated Jun. 16, 2020.
(Continued)

*Primary Examiner* — Kurt Fernstrom
(74) *Attorney, Agent, or Firm* — ALLEN, DYER, DOPPELT, + GILCHRIST, P.A. Attorneys at Law

(57) ABSTRACT

A surgeon training apparatus includes a cassette, which includes biological tissue re-purposed into a form consistent with the anatomical configuration of a foregut, affixed into an anatomically correct framework which replicates the abdominal anatomy. The framework positions the cassette in an anatomically correct position within the abdominal cavity, enabling surgeons to train using a properly positioned representation of the target anatomy, thus requiring the surgeon to properly use surgical tools to simulate surgical operations performed on a foregut. The cassette is formed by applying biologic tissue to a specially designed "plate," which affixes the tissue block into the anatomic framework. The cassette can be positioned inside a mannequin, and can be used to train surgeons to perform surgeries using multiple techniques, including robot assisted and laparoscopic methods.

17 Claims, 6 Drawing Sheets

Related U.S. Application Data

(60) Provisional application No. 62/829,931, filed on Apr. 5, 2019.

(56) References Cited

U.S. PATENT DOCUMENTS

| | | | |
|---|---|---|---|
| 5,817,084 | A | 10/1998 | Jensen |
| 5,951,301 | A * | 9/1999 | Younker ............... G09B 23/285 |
| | | | 434/272 |
| 6,331,181 | B1 | 12/2001 | Tierney et al. |
| 6,441,577 | B2 | 8/2002 | Blumenkranz et al. |
| 6,491,701 | B2 | 12/2002 | Tierney et al. |
| 6,817,974 | B2 | 11/2004 | Cooper et al. |
| 7,798,815 | B2 | 9/2010 | Ramphal et al. |
| 7,866,983 | B2 * | 1/2011 | Hemphill ............... G09B 23/34 |
| | | | 434/262 |
| 7,963,913 | B2 | 6/2011 | Devengenzo et al. |
| 8,696,362 | B2 | 4/2014 | Eggert et al. |
| 9,373,270 | B2 * | 6/2016 | Miyazaki ............... G09B 23/34 |
| 9,953,548 | B2 * | 4/2018 | Fradette ................ G09B 23/32 |
| 9,990,862 | B2 | 6/2018 | Choi |
| 2005/0008997 | A1 | 1/2005 | Herman |
| 2013/0330700 | A1 | 12/2013 | Feins et al. |
| 2016/0314711 | A1 | 10/2016 | Grubbs |
| 2016/0314716 | A1 * | 10/2016 | Grubbs ................ G09B 23/306 |
| 2017/0294146 | A1 | 10/2017 | Grubbs |
| 2019/0371206 | A1 | 12/2019 | Segall |

OTHER PUBLICATIONS

Vertut, J, and Coiffet, P., "Robot Technology: Teleoperation and Robotics Evolution and Development," English translation, Prentice-Hall, Inc., Inglewood Cliffs, NJ, USA 1986, vol. 3A, 332 pages.

* cited by examiner

SIMULATION MODEL FOR LAPAROSCOPIC FOREGUT SURGERY

CROSS-REFERENCE TO RELATED APPLICATIONS

This application is a continuation in part and claims priority to International Application No. PCT/US2020/026659 having an international filing date of Apr. 3, 2020, which is related and claims priority to U.S. Provisional Patent Application No. 62/829,931 filed on Apr. 5, 2019. The entire disclosures of said applications are incorporated herein by reference.

FIELD OF THE INVENTION

The present invention relates to the field of surgery, where the surgery is performed on a surgical simulator rather than on a live human or animal. The invention further relates to a simulated model for laparoscopic foregut surgery.

BACKGROUND

A significant gap presently exists between box-lap and virtual-reality simulators and live surgery. There are significant downsides to using live animal and cadaver models.

It would be advantageous to have the ability to simulate laparoscopic foregut surgeries, in order for surgeons to be able to practice surgeries on a simulated model rather than learning on a live patient. However, on information and belief, there are currently no usable animal anatomically correct portions of tissue that can be used to train surgeons because there are no animal anatomically similar configurations occurring in nature. This contrasts with the porcine heart and lungs which are very similar in size and structure to human anatomy, i.e., simulations using porcine heart and lungs can be accomplished using the intact organ because of the anatomic similarities.

It would be advantageous to have improved models for use in training surgeons. The present invention provides such an improved model, for use in simulated foregut surgeries.

SUMMARY OF THE INVENTION

In one embodiment, the invention relates to a high fidelity, real tissue simulator that allows training in laparoscopic foregut operations, for example, laparoscopic Heller myotomy, Nissen fundoplication, and sleeve gastrectomy.

In one aspect of this embodiment, the foregut surgery model is based on porcine tissue blocks that include two or more, preferably three or more, more preferably four or more, and still more preferably, all of the lungs, heart, aorta, esophagus, diaphragm, stomach, omentum, duodenum, liver, and spleen.

In some embodiments, the tissue is sourced in multiple components, from multiple animals. By way of a non-limiting example, the lungs, heart, aorta and diaphragm can be sourced from one animal, stomach, liver, spleen and duodenum from another animal, omentum from another animal, and small intestine from another animal.

In some embodiments, the tissue blocks are mounted in a human mannequin, and perfused with real and/or artificial/fake blood. In other aspects, the tissue blocks are not perfused with real or fake blood, but rather, a pulse is simulated mechanically, for example, by positioning a balloon in an appropriate position in the tissue blocks, and inflating and deflating the balloon. To mimic a "normal" pulse, the balloon is inflated and deflated at a rate of between about 60 and about 80 times per minute.

Accordingly, in some aspects, the cassette is substantially devoid of real or artificial blood, and in others, the biological tissue is adapted to be able to perfuse real or artificial blood.

In some aspects, the simulated anatomic framework is a silicone model of the abdominal cavity, and/or the cassette can be adapted for insertion into the simulated abdominal cavity of a mannequin. The combination of the cassette and the mannequin into which the cassette is inserted is referred to herein as a surgical training apparatus.

In some aspects, a film of a salt/hydrogel solution overlies all or part of the biological tissue. This allows the biological tissue to conduct electricity, thus allowing a surgeon to practice electrocautery.

In one embodiment, the cassette comprises:
a) biological tissue mimicking a foregut, and b) a plate to which the tissue is adhered,
wherein:
a) the plate is adapted to be connected to a mannequin, and to affix the tissue into a simulated anatomic framework that mirrors the human abdomen and/or foregut,
b) the biological tissue comprises porcine tissue blocks that include two or more of the lungs, heart, aorta, esophagus, diaphragm, stomach, duodenum, liver, and spleen, and
c) an esophageal conduit comprising a porcine esophagus, wherein the porcine esophagus is linked to the mannequin, and the esophageal conduit is adapted to allow for gastric intubation via nasogastric tube insertion and/or passage of esophageal dilators.

In this embodiment, the porcine esophagus can intubated with tubing, which typically ranges in diameter from between about one quarter inch to one inch, for example, around a half of an inch. To prevent the tubing from moving within the esophagus, the esophagus and tubing can be physically secured and/or or chemically adhered together. The esophagus and tubing can be physically adhered, for example, using surgical staples, sutures, zip ties, clips, and the like, and can be chemically adhered, for example, using adhesives, including cyanoacrylate glue and urethane glue, or using caulk.

In one aspect of this embodiment, the tubing comprises a length of rubber disposal tubing positioned so as to engage with the conduit, in a manner which allows passage of dilators with a size up to 48 Fr. The cassette can further comprise a means for simulating a pulse.

The cassettes can be present in a surgeon training apparatus comprising a mannequin, and
the cassettes, and can be used, for example, in methods of simulating percutaneous endoscopic gastrostomy by endoscopically accessing the stomach in the cassette through the esophageal conduit. In some aspects, the surgical training apparatus, comprising the mannequin and the cassette positioned inside the mannequin is providing on an operating table, and the surgeon practices percutaneous endoscopic gastrostomy or other similar procedures on the cassette.

In another embodiment, the cassette comprises biological tissue mimicking a foregut, and a plate to which the tissue is adhered. The plate is adapted to be connected to a mannequin, and to affix the tissue into a simulated anatomic framework that mirrors the human abdomen and/or foregut. The biological tissue comprises porcine tissue blocks that include two or more of the lungs, heart, aorta, esophagus, diaphragm, stomach, duodenum, liver, and spleen, and at least includes a diaphragm, and the cassette comprises a collapsible hoop to suspend the porcine diaphragm. The porcine diaphragm can be suspended anteriorly, for example, by physically attaching, or chemically adhering, the tissue to the collapsible hoop. Optionally, but preferably, the collapsible hoop is secured to the plate. The tissue blocks can optionally comprise a means for simulating a pulse.

In some aspects of this embodiment, the biological tissue comprises three or more, preferably four or more, and more preferably, all of the lungs, heart, aorta, esophagus, diaphragm, stomach, duodenum, liver, and spleen. In some aspects, the cassette is substantially devoid of real or artificial blood, and in others, the biological tissue is adapted to be able to perfuse real or artificial blood. In still other aspects, the tissue blocks comprise a means for simulating a pulse.

The simulated anatomic framework can be a silicone model of the abdominal cavity, and the cassette can be adapted for insertion into the simulated abdominal cavity of a mannequin.

In one aspect, a film of a salt/hydrogel solution overlies all or part of the biological tissue, allowing the surgeon to practice electrocautery.

In one embodiment, the hoop is secured to the mannequin with an elastic bungee cord to allow for diaphragmatic motion. The biological tissue comprises lungs, and the cassette further comprises a means for simulating respiration. The means for simulating respiration can include, for example, pneumatic balloon insufflation, as is described, for example, in U.S. Publication No. 20170294146.

In one aspect of this embodiment, the cassettes are packaged in a vacuum sealed bag, and the biological tissue is preserved using an alcohol-based preservative. The hoop can also lay flat. This allows the biological tissue in the cassette to be preserved, stored, and shipped without substantial tissue degradation, and allows the cassettes to be easily placed into a mannequin.

These cassettes can be used in a surgeon training apparatus that includes the cassettes, and a mannequin, where the cassettes are inserted into the mannequin, and used in methods for simulating percutaneous endoscopic gastrostomy and other surgical procedures where the gastrointestinal tract is accessed through the esophagus.

In still another embodiment, the cassette comprises biological tissue mimicking a foregut, and a plate to which the tissue is adhered, wherein:
  a) the plate is adapted to be connected to a mannequin, and to affix the tissue into a simulated anatomic framework that mirrors the human abdomen and/or foregut,
  b) the biological tissue comprises porcine tissue blocks that include two or more, preferably three or more, more preferably four or more, and most preferably, all of the lungs, heart, aorta, esophagus, diaphragm, stomach, duodenum, liver, and spleen, and
  c) the biological tissue further comprises a length of porcine small intestine with intact mesentery, measuring between approximately 6 and approximately 8 feet in length. This allows a surgeon to practice simulated surgery on the small intestine.

In one aspect of this embodiment, the tissue blocks comprise a means for simulating a pulse, and are substantially devoid of real or artificial blood. In another aspect, the biological tissue is adapted to be able to perfuse real or artificial blood. The cassette can include a simulated anatomic framework, which can be a silicone model of the abdominal cavity, and the cassette can be adapted for insertion into the simulated abdominal cavity of a mannequin.

In another aspect, a film of a salt/hydrogel solution overlies all or part of the biological tissue.

In use, these cassettes can be used in a surgeon training apparatus that includes a cassette and a mannequin, where the cassette is inserted into the mannequin, and optionally provided on an operating table.

In still another embodiment, the cassettes comprise biological tissue mimicking a foregut, and a plate to which the tissue is adhered, wherein:
  a) the plate is adapted to be connected to a mannequin, and to affix the tissue into a simulated anatomic framework that mirrors the human abdomen and/or foregut,
  b) the biological tissue comprises porcine tissue blocks that include two or more, preferably three or more, more preferably, four or more, and still more preferably, all of the lungs, heart, aorta, esophagus, diaphragm, stomach, duodenum, liver, and spleen, and
  c) the biological tissue further comprises a segment of the small bowel, wherein the segment of the small bowel is fixed to the plate.

These types of cassettes can be used, for example, to simulate surgical procedures on the small bowel. Representative procedures include small bowel resection, surgery to remove tumors from the small bowel, surgery to remove bowel obstructions and/or adhesions, colectomy, strictureplasty, lateral internal sphincterotomy, ligation, transanal endoscopic microsurgery, anoplasty, bowel diversion, colostomy and polypectomy.

As with other embodiments, the tissue blocks can include a means for simulating a pulse, and the cassette can be substantially devoid of real or artificial blood, or perfused with real or artificial blood. The simulated anatomic framework can be a silicone model of the abdominal cavity, the cassette can be adapted for insertion into the simulated abdominal cavity of a mannequin, and a film of a salt/hydrogel solution can overlie all or part of the biological tissue.

In one aspect of this embodiment, the small bowel is adhered to the plate by drilling two or more holes in the plate, and suturing the small bowel to the plate and/or adhering the small bowel to the plate with an adhesive, such as caulk or glue.

In use, this model re-creates the ligament of Treitz, thus allowing a user to measure and choose the appropriate site for division of the small bowel and creation of the gastric limb and entero-enterostomy. As such, it can be present in a surgeon training apparatus comprising a mannequin and a cassette of this embodiment, comprising a segment of the small bowel. The apparatus can be used, optionally where the mannequin is present on an operating table, in methods of simulating a gastric bypass operation, such as a roux-en-Y gastric by-pass.

In any of the embodiments described herein, the cassette can also include a porcine ureter and/or one or more blood vessels selected from the group consisting of the abdominal aorta, the main celiac trunk or its major branches, gastroepiploic vessels and mesenteric vessels. In one aspect of these embodiments, one or more luer tipped catheters can be introduced into one or more of the porcine ureter and/or one or more blood vessels. A means for providing pulsatile perfusion of real and/or fake blood through the one or more blood vessels or porcine ureter can also be present. In this manner, the cassette can be used in methods of simulating vessel sealing exercises, wherein one or more blood vessels in the surgical system is cut, and the physician can practice sealing the cut vessel, for example, using sutures, staples, and/or electrocautery.

In any of the embodiments described herein, the cassette can also include a native porcine aorta (descending aorta), and used in methods of simulating aortic pulsation without perfusing blood, by placing a balloon in the porcine aorta, and inflating and deflating the balloon at a rate of between about 60 and about 80 times per minute.

In any of the embodiments described herein, the cassette can also include a length of en bloc porcine esophagus comprising one or more vagus nerve segments. The vagus nerve segments can allow for simulations that include the performance of anastomosis of the distal esophagus to the stomach or small bowel. For example, the cassettes can be used in methods of simulating esophagogastrectomy, total gastrectomy, and similar surgeries, whether by traditional laparoscopic or robotic assisted methods.

For example, an en bloc esophagectomy is an esophagectomy procedure. During this procedure, the doctor takes out the esophagus, a portion of the stomach, and all of the lymph nodes in the chest and abdomen. The surgery is performed through the neck, chest, and abdomen. The doctor reshapes the remainder of the stomach and brings it up through the chest to replace the esophagus. A radical en bloc esophagectomy can be used, for example, to treat a potentially curable tumor, so in one embodiment, one or more of the organs comprises a real or simulated tumor. In some embodiments, the organs comprise one or more of lymph nodes, stomach, and esophagus.

In any of the embodiments described herein, the surgical simulation system can include, along with the cassette and the mannequin in which the cassette is placed, a disposable plastic bag placed beneath the tissue block and plate prior to placement in the mannequin to allow for easy cleanup and tissue disposal.

Further, in any of the embodiments described herein, the surgical simulation system can include along with the cassette and the mannequin in which the cassette is placed, a silicone drape placed inside the mannequin to simulate the retroperitoneal background and improve fidelity during use of the model.

Still further, in any of the embodiments described herein, the anterior abdominal wall can be constructed so as to allow for laparoscopic or robotic surgical training.

The present invention will be better understood with reference to the following detailed description.

DETAILED DESCRIPTION

Figure 1:
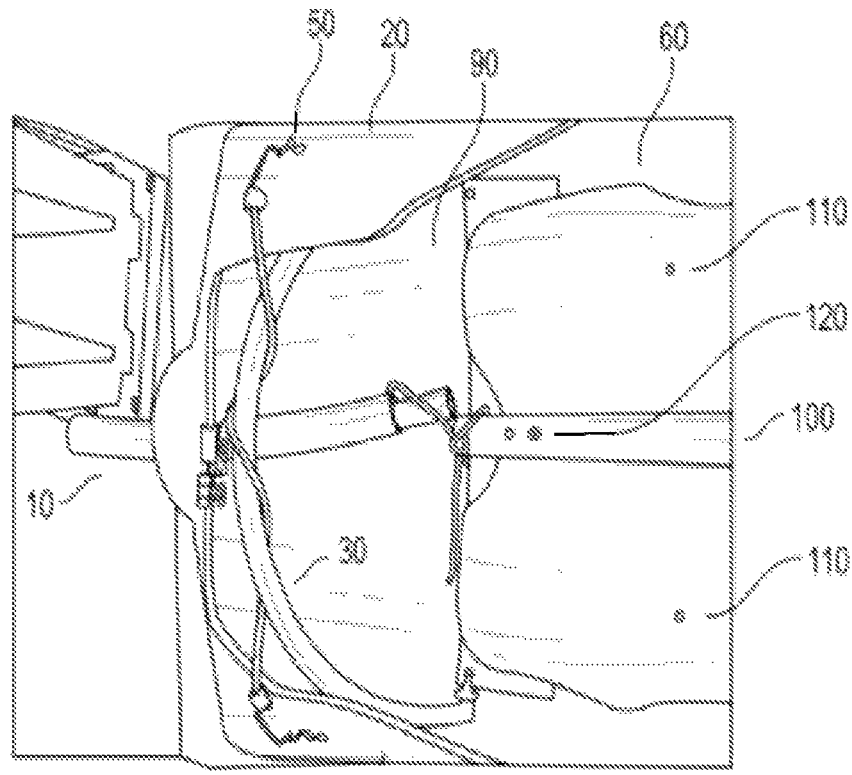
FIG. 1 is a schematic illustration of a mannequin adapted to receive the foregut tissue model, where a tube is adapted to be placed in the esophagus of the organ system.

The present invention will be better understood with reference to the following definitions:

Simulation is defined as "a situation in which a particular set of conditions is created artificially to experience something that could exist in reality."

In one embodiment, the invention relates to a high fidelity, real tissue simulator that allows training in laparoscopic foregut operations, for example, laparoscopic Heller myotomy, Nissen fundoplication, and sleeve gastrectomy. In other embodiments, portions of the lower intestine and/or lower bowel are included, and allow the model to be used for simulating surgery on the intestine and/or bowel.

In various aspects of the simulated bariatric/foregut surgical model described herein, the model comprises one or more of the following features:

Esophageal Conduit

An esophageal conduit linking the mannequin to the porcine esophagus allows for gastric intubation for nasogastric tube insertion and passage of esophageal dilators critical to the performance of sleeve gastrectomy and helpful in esophageal myotomy and antireflux operations. The porcine esophagus can be intubated, for example, with ½" ID PVC tubing, and secured, for example, with zip ties. Within the patient mannequin, a length of rubber disposal tubing can be positioned to engage with the conduit, allowing passage of dilators, including those up to 48 Fr. Access to the stomach through the esophagus allows for endoscopic access and the simulation of percutaneous endoscopic gastrostomy Collapsible Hoop to Suspend the Porcine Diaphragm The porcine diaphragm can be suspended anteriorly, for example, by suturing tissue to a collapsible plastic hoop secured to the specially designed plastic plate, such as a thermoplastic plate, preferably a Kydex plate, to which the organ block is secured. This set-up allows for flat packaging of the tissue block in a vacuum sealed bag. The combined use of an alcohol-based preservative allows for preservation, storage, shipping and easy placement into the mannequin.

Diaphragmatic Motion

The diaphragmatic suspensory hoop can be secured to the mannequin, for example, with an elastic bungee cord to allow for diaphragmatic motion and the use of pneumatic balloon insufflation to simulate respiration when desired.

Small Bowel Preparation

A length of porcine small intestine with intact mesentery, for example, measuring approximately 6-8 feet in length, can be present. One way to prepare the intestine for use in the model involves vigorous open irrigation, using tap water, for example, until clear. This process removes internal material and creates distension of the bowel, which persists and better simulates the human condition.

Small Bowel (Jejunal) Simulation Model

It can be useful, when simulating the Roux-en-Y gastric bypass, to add a small bowel segment with fixation of the proximal bowel to the plastic plate, for example, by drilling some holes and suturing in place, and/or adhering with an adhesive, such as caulk or glue) to re-create the ligament of Treitz. This feature allows the user to measure and choose the appropriate site for division of the small bowel and creation of the gastric limb and entero-enterostomy.

Disposable Bag

A disposable plastic bag can be placed beneath the tissue block and plate prior to placement in the mannequin to allow for easy cleanup and tissue disposal.

Silicon Drape

A silicone drape can be used inside the mannequin to simulate the retroperitoneal background and improve fidelity during use of the model.

Pulsatile Perfusion

Pulsatile perfusion can be accomplished by introducing luer tipped catheters into vessels which may include, for example, the abdominal aorta, the main celiac trunk or its major branches, gastroepiploic or mesenteric vessels. A fake blood formulation, such as those described herein, can be infused using a pulsatile actuator. In this manner, fidelity can be enhanced, and vessel sealing exercises included in the surgical model. An alternative method of simulating pulsatile vascular flow can include placing a porcine ureter as a surrogate vessel into the model.

Dry Aortic Pulsation

Aortic pulsation can also be provided by placing a balloon with the native porcine aorta (descending aorta) using intermittent pneumatic or liquid inflation. Ideally, the balloon inflates and deflates between around 60 and 80 times per minute, so as to simulate a pulse. In this manner, a pulse can be mimicked without perfusing blood, which prevents leakage of fluid into the cavity.

Esophageal Length

In one embodiment, the model includes a length of enbloc porcine esophagus with vagus nerve segments to allow for simulations which include the performance of anastomosis of the distal esophagus to the stomach or small bowel. Stapled, handsewn, adhered, or hybrid techniques can be performed. This capability can be used to simulate a component of both esophagogastrectomy and total gastrectomy, whether done by traditional laparoscopic or robotic assisted methods.

The individual components of the model, and the embodiments discussed above, are discussed in more detail below.

The Cassettes, and Mannequins Including the Cassettes

The cassettes described herein include biological tissue mimicking a foregut, and a plate to which the tissue is adhered. The plate is typically prepared from a thermoplastic material, like Kydex, and is adapted to a) be connected to a mannequin, and b) to affix the tissue into a simulated anatomic framework that mirrors the human abdomen and/or foregut.

The plate is adapted to be connected to a mannequin, and to affix the tissue into a simulated anatomic framework that mirrors the human abdomen and/or foregut. The "plate" is also adapted to enable rapid changes of the cassette, which can facilitate surgical training of multiple surgeons. The plates can be removed and replaced in a relatively rapid manner, so that multiple duplicative procedures can be done.

In this manner, a single surgeon can practice a simulated foregut operation multiple time, and/or multiple surgeons can practice a simulated foregut operation.

In some aspects, the simulated anatomic framework is a silicone model of the abdominal cavity, and/or the cassette can be adapted for insertion into the simulated abdominal cavity of a mannequin. In some embodiments, the mannequin includes only the abdominal cavity, but in other embodiments, can also include one or more of a head, feet, and hands.

The simulated anatomic framework can be a silicone model of the abdominal cavity, and the cassette can be adapted for insertion into the simulated abdominal cavity of a mannequin.

In some embodiments, the tissue blocks are mounted in a human mannequin, and perfused with real and/or artificial/fake blood. In other aspects, the tissue blocks are not perfused with real or fake blood, but rather, a pulse is simulated mechanically, for example, by positioning a balloon in an appropriate position in the tissue blocks, and inflating and deflating the balloon. To mimic a "normal" pulse, the balloon is inflated and deflated at a rate of between about 60 and about 80 times per minute. Accordingly, in some aspects, the cassette is substantially devoid of real or artificial blood, and in others, the biological tissue is adapted to be able to perfuse real or artificial blood.

In one embodiment, a hoop is present on the tissue, such as the esophagus, and the hoop is secured to the mannequin with an elastic bungee cord to allow for diaphragmatic motion. In one aspect of this embodiment, the biological tissue comprises lungs, and the cassette further comprises a means for simulating respiration. The means for simulating respiration can include pneumatic balloon insufflation.

In one aspect of this embodiment, the cassettes are packaged in a vacuum sealed bag, and the biological tissue is preserved using an alcohol-based preservative. The hoop can also lay flat. This allows the biological tissue in the cassette to be preserved, stored, and shipped without substantial tissue degradation, and allows the cassettes to be easily placed into a mannequin.

These cassettes can be used in a surgeon training apparatus that includes the cassettes, and a mannequin, where the cassettes are inserted into the mannequin, and used, for example, in methods for simulating percutaneous endoscopic gastrostomy.

The mannequin can include an animal tissue cassette, and be mounted on the operating table for the surgeon to then perform simulated surgery. In some embodiments, the mannequin includes at least one animating device, for example, those described in U.S. Patent Publication No. 20160314711, which may include a movement animating device to simulate at least one of the breathing and heartbeat, including normal and abnormal breathing, and normal and abnormal heartbeat. An inflator can be configured to be coupled to harvested lung tissue to inflate the lung tissue, and/or be connected to heart tissue via inflatable balloons, which balloons can be pulsed to form a simulated heartbeat. The mannequin may include drain gutters and drain holes to remove excess liquid from the body cavity.

In any of the embodiments described herein, the surgical simulation system can include, along with the cassette and the mannequin in which the cassette is placed, a disposable plastic bag placed beneath the tissue block and plate prior to placement in the mannequin to allow for easy cleanup and tissue disposal.

Further, in any of the embodiments described herein, the surgical simulation system can include along with the cassette and the mannequin in which the cassette is placed, a silicone drape placed inside the mannequin to simulate the retroperitoneal background and improve fidelity during use of the model.

Still further, in any of the embodiments described herein, the anterior abdominal wall can be constructed so as to allow for laparoscopic or robotic surgical training.

Modules including the tissue, organs, and/or organ blocks, along with the quick connections to sources of gas, vacuum, and/or animal or fake blood, can be quickly inserted into a relevant portion of a segmented mannequin. The modules can be connected via one or more quick connect fittings to corresponding fittings on a convenient umbilical cable port to quickly prepare a mannequin for simulated robotic surgery.

In some embodiments, the operating table includes a lift mechanism to move the animal tissue cassette and/or mannequin between different operating positions.

Tissues/Organs/Organ Systems

A group of animal tissue collections can be made from a series of animals before butchering for food so that no animals are sacrificed beyond what would be butchered for food. By collecting a series of tissue collections by the same facility using the same procedure from the same herd of animals (same breed, same age, same food), there will be extensive similarities among the collected tissue samples.

As is understood by those of skill in art, some features vary even between identical twins such as the vascular pattern around the exterior of the heart, so some features cannot be closely controlled. However, certain degrees of variability can be decreased by clustering tissue samples by gender of donor animal, nominal weight of donor animal, or some other property of the animal or classification made of the harvested tissue sample.

The organs used in the surgical simulators can be preselected so as to have various defects, such as tumors, valve defects, arterial blockages, and the like, or can be selected to be as close to identical as possible. In the former embodiment, a surgeon can demonstrate a particular type of operation where a particular defect is present, and in the latter embodiment, a surgical instructor can demonstrate a technique to multiple students, using organs that are closely matched, so that the results would be expected to be the same if the students perform the surgery correctly.

In general, the organs may be characterized using a wide variety of available metrics. These may include volume of ventricles, stiffness of the muscle tissue (restitution test), specific gravity, % fat, pressure testing, presence or absence of tumors, blockage or arteries, etc. The recorded metrics will be specific to the scenario being replicated. Ideally, the organs selected are as close to the size and weight of human organs.

Examples of classification of the tissue samples may include:
A) Some characterization of the amount of fatty material surrounding the tissue of interest.
B) Some characterization of the pliability/stiffness of the tissue.
C) Some characterization of the properties of the relevant blood vessels such as degree of occlusion.
D) One way to characterize an organ is the time it takes for a fluid to drip out from a container and into an organ. As the receiving volume of the organ will be relatively uniform (for organs of the same size) this may characterize the ability of fluids to flow through the structures in the organ and out.

Simulated Tumors

In some embodiments, tumors from animals can be harvested, an incision can be made in a tissue, organ or organ system in which a simulated tumor excision is to be performed, and the tumor adhered using surgical glue or caulk, such as silicone caulk. Alternatively, caulk, such as silicone caulk, can be appropriate shaped and hardened, and be used as a simulated tumor.

Where a tissue, organ, or organ system is to include a "hidden" tumor, which is intended to be found during a simulated surgical procedure, the incision can be made anywhere it is desired, and the tumor can be located (and, ideally, exised) by the physician during the simulated surgical procedure.

Like a tumor, a placenta is also highly vascularized. When inverted, placental tissue can reasonably mimic a tumor. In some embodiments, where it is desired to simulated surgical excision of tumors, a portion of placental tissue, turned inside out, can be adhered to a desired tissue, organ, or organ system, or wrapped around an artery, vein, or spinal cord, and the surgeon can practice surgical excision of such "tumors."

Use of Salt/Hydrogel Solutions to Provide Conductivity

In some aspects, a film of a salt/hydrogel solution overlies all or part of the biological tissue. This allows the biological tissue to conduct electricity, thus allowing a surgeon to practice electrocautery.

Representative Xenographic Organ Preparation

The cassettes described herein include porcine organ blocks including two or more, preferably three or more, more preferably four or more, and still more preferably, all of the lungs, heart, aorta, esophagus, diaphragm, stomach, duodenum, liver, and spleen.

In one embodiment, where only these organs are present, rather than being perfused with real and/or fake blood, the organ blocks are adapted to mimic a pulse, for example, by having a balloon inside one or more of the organs inflate and deflate between about 60 and about 80 times a minute. This allows one to mimic surgery, where organs are moving in response to the pulse, but when the organs are cut during the simulated surgery, there is less fluid to clean up after the simulated surgery. In one aspect of this embodiment, real and/or fake blood is also perfused, while the pulse is simulated.

In another embodiment, in addition to the organs discussed above, the organ blocks also include an esophageal conduit comprising a porcine esophagus. The porcine esophagus can be linked to the mannequin, and the esophageal conduit can be adapted to allow for gastric intubation via nasogastric tube insertion and/or passage of esophageal dilators.

In this embodiment, the porcine esophagus can intubated with tubing, which typically ranges in diameter from between about one quarter inch to one inch, for example, around a half of an inch. To prevent the tubing from moving within the esophagus, the esophagus and tubing can be physically secured and/or or chemically adhered together. The esophagus and tubing can be physically adhered, for example, using surgical staples, sutures, zip ties, clips, and the like, and can be chemically adhered, for example, using adhesives, including cyanoacrylate glue and urethane glue, or using caulk.

In one aspect of this embodiment, the tubing comprises a length of rubber disposal tubing positioned so as to engage with the conduit, in a manner which allows passage of dilators with a size up to 48 Fr. The cassette can further comprise a means for simulating a pulse.

In use, this allows a surgeon to work on simulated surgeries on the esophagus, or where the esophagus is the entry point for the surgeon to access other organs. For example, one can simulate percutaneous endoscopic gastrostomy by endoscopically accessing the stomach in the cassette through the esophageal conduit.

In another embodiment, in addition to the organs discussed above, the biological tissue further comprises a length of porcine small intestine with intact mesentery, measuring between approximately 6 and approximately 8 feet in length, which allows a surgeon to practice simulated surgery on the small intestine. Examples of surgery on the small intestine, which can be performed laparoscopically, include the removal of adhesions (intestinal scar tissue), treatment of abdominal pain, removal of intestinal blockages or obstructions, removal of polyps/tumors, and treatment of internal hernias.

In another embodiment, in addition to the organs discussed above, the biological tissue further comprises a length of small bowel, which allows a surgeon to practice simulated surgery on the small bowel. Representative procedures, which can be performed laparoscopically, include small bowel resection, surgery to remove tumors from the small bowel, surgery to remove bowel obstructions and/or adhesions, colectomy, stricture-plasty, lateral internal sphincterotomy, ligation, transanal endoscopic microsurgery, anoplasty, bowel diversion, colostomy and polypectomy.

In one aspect of this embodiment, the small bowel is adhered to the plate by drilling two or more holes in the plate, and suturing the small bowel to the plate and/or adhering the small bowel to the plate with an adhesive, such as caulk or glue.

In use, this model re-creates the ligament of Treitz, thus allowing a user to measure and choose the appropriate site for division of the small bowel and creation of the gastric limb and entero-enterostomy. As such, it can be present in a surgeon training apparatus comprising a mannequin and a cassette of this embodiment, comprising a segment of the small bowel. The apparatus can be used, optionally where the mannequin is present on an operating table, in methods of simulating a gastric bypass operation.

In some embodiments, organ preparation can begin with an incision of the pericardium on the right posterior side of the heart, so it can later be reattached with no noticeable holes when viewed from the left side. The superior vena cava, inferior vena cava, right pulmonary artery, and right pulmonary veins can then be divided with care taken to leave as much vessel length as possible. After the right lung is fully detached, the organs can be washed extensively to remove coagulated blood from the heart and vessels. All divided vessels, except for the main branch of the right pulmonary artery and right superior pulmonary vein, can be tied off, for example, using 0-silk.

As an example of quick-connect tubes, small diameter plastic tubes with Luer-Lok® connectors can then be placed into the divided right pulmonary artery and right superior pulmonary vein, and fixed in place, for example, using purse-string sutures. To create distention of the aorta, one can inject silicone caulking to the level of the ascending aorta, or, alternatively, insert a solid cylinder such as, for example, a foam backer rod.

After the silicone cures, the brachiocephalic trunk and left common carotid can be tied off, for example, using 0-silk.

The left main stem bronchus can be occluded, for example, by stapling the divided right main stem bronchus as well as the proximal trachea. The left hilum can remain unaltered, and all modifications to the heart can be hidden by the pericardium during the procedure.

Following preparation, the organs can be stored at a relatively low temperature, for example, 4 degrees Celsius, in an alcoholic solution, for example, 10% ethanol containing ½ teaspoon of red food coloring. In this manner, the organs typically remain fresh for at least 1 month. Use of higher concentrations of alcohol, such as 40% ethanol, can preserve the organs for over a year, and, ideally, up to 18 months, and can perform as well as freshly-harvested organs.

Simulating "Bleeders"

While there is value in having intact organs on which to operate, there is also value in having organs with a defect such that, during surgery, the simulation can test the surgeon's ability to handle a "bleeder."

One of the benefits of the present invention is the ability to precisely create trauma in ex vivo tissue samples, for example, by making one or more incisions, then "clotting" the blood composition to close the incision. During surgery, the clot can be dissolved, for example, by appropriately placing an agent in the blood that dissolves the clot, or by injecting an agent that dissolves the clot into an IV. The clotting agents and clot dissolving agents include those described above. The surgeon can then practice electrocautery.

Simulated Fat Layers

In prior art simulated organ systems, a thin layer, roughly an inch or less, of simulated fat was used by preparing a layer of silicone gel/caulk over a simulated organ. While this can be representative of thin patients, it is not representative of the type of overweight to obese patients normally seen in surgical procedures.

Pig bellies tend to include a large amount of fatty tissue. This fat can be harvested, and a layer of fat up to six inches thick, but preferably between about 1 and about 4 inches in thickness, can be adhered to an organ, for example, using surgical adhesive, caulk, and the like. The surgeon cutting into a "patient" in a simulated surgical procedure using a robotic instrument will have to cut through all of this fat to get to the tissue/organ/organ system, which can provide a realistic simulation. The layer of fat can overly one or more types of tissue/organs/organ systems in the gastrointestinal tract, including stomach, duodenum, caecum, lower intestine, upper intestine, and colon, as well as the liver, gall bladder, and spleen.

Incisions can be made in an animal liver, such as a pig liver, and portions of fat inserted, to simulate a patient with fatty liver.

Simulated Body Fluids Which Can be Present

In one aspect, where the organ blocks include a portion of the small bowel, they can be adapted to include a fluid that is sufficiently conductive so as to permit electrocautery. This fluid can include a hydrogel, such as KY jelly, polyethylene glycol, and the like, a salt, such as sodium or potassium chloride, a color, ideally one that mirrors the color of the normal contents of the bowel, and one or more food products, such as carrots, peas, and the like. Odorants, such as butyric acid and other $C_{2-8}$ carboxylic acids can also be present. The same or similar components can be present in other organs in the gastrointestinal tract, although one would not necessarily expect the smell of butyric acid from a stomach, duodenum, or upper intestine.

Where surgery is performed on a spleen, "blood" perfusing through the spleen during the surgical procedure can leak out.

Where surgery is performed on a gall bladder, simulated bile can be present.

A review of simulated fluids that can be used can be found at Marques, et al, "Simulated Biological Fluids with Possible Application in Dissolution Testing," Dissolution Technologies, August 2015, the contents of which are hereby incorporated by reference.

Fake Blood Formulations

In some embodiments, the simulated surgical model involves perfusing real and/or fake blood through one or more of the organs, and in other embodiments, the organs are not perfused with real or fake blood.

In some aspects of those embodiment where fake blood is perfused, the fake blood composition includes one or more colorants, including dyes and inks, which preferably color the composition red, but which can be any desired color. Examples of such colorants include, but are not limited to, food dyes such as red dye #40 and FD&C blue #1. Although red dyes can be used exclusively, blue or green dyes can be used to achieve a more realistic shade. As a general rule, arterial blood is bright red, while venous blood is a dark maroon color.

In some embodiments, the compositions further include a protein, which can be a milk protein such as whey (including whey isolate and whey concentrate) or casein, egg white protein, an animal protein, such as beef protein, a vegetable protein, such as soy, pea, rice, or hemp, or combinations thereof.

Isolated proteins can be preferred, as they can impart the least "haze" to the blood, and result in a more natural appearance. However, if haze is not of concern, non-isolated proteins, such as milk products, including low-fat and non-fat milk, can be used. Any suitable protein can be used, so long as it can be "clotted" upon exposure to solutions of clotting agents, as such are defined herein. The concentration of the protein can vary, but is typically within the range of between about 0.1 and 10 by weight of the blood composition (dry weight).

Although not necessary, in some embodiments, the compositions can include one or more sugars. Examples of sugars include glucose, dextrose, fructose, corn syrup, and the like. The concentration of the sugar can vary, but is typically within the range of between about 0.1 and 2 by weight of the blood composition (dry weight).

The compositions can also include thickeners, such as xanthan gum and vegetable starches, such as potato starch, corn starch and hydroxyethyl starch (HES). At some concentration, these thickeners will cause the blood to thicken to the extent that it mimics a blood clot. However, if used at low enough concentrations, thickeners can be present in an amount sufficient that the blood has a viscosity within a range of plus or minus about 20 percent the viscosity of human blood.

The compositions can optionally include one or more salts, including sodium and potassium chloride, and buffers such as those including phosphate, ascorbate, acetate, and similar salts, and their conjugate acids. For example, standard 0.9% phosphate buffered saline can be used.

The amount of salts, sugars, and proteins should be selected to provide a fake blood composition with sufficient protein content to enable the blood to be clotted when clotting agents such as potato starch, corn starch, and hydroxyethyl starch are used, and with an osmolality and osmolarity within about 20% of that of human blood. Blood osmolality is typically measured in milliosmoles per kilogram, and a normal result is typically between about 275 and about 303 milliosmoles per kilogram. Accordingly, the fake blood described herein preferably has an osmolality between about 220 and about 400 milliosmoles per kilogram.

In one embodiment, the ion concentration is selected to approximate that in 0.9% phosphate buffered saline, that is, to be within around 20% plus or minus of this ion concentration, so as to provide a fake blood composition that can conduct electricity. This can be particularly important where a surgeon practicing a simulated surgical procedure intends to use electro-cautery to seal a wound. A fake blood composition without a sufficient ion concentration would not conduct electricity in an efficient enough manner to simulate the actual electro-cautery conditions a surgeon would expect from a live patient, thus providing the surgeon with a less realistic training scenario.

Where electro-cautery is to be practiced, it is also important to provide a source of "ground." In one embodiment, this can be accomplished by attaching a wire directly to one of the tissues, organs, or organ systems described herein, for example, using an alligator clip. In one aspect of this embodiment, the clip can be attached to the esophagus, assuming the organ or organ system has an esophagus, or to another organ, if not. The "ground" is sufficiently far from the area in which the electro-cautery is to take place that it can avoid significant complications, although the organ may tend to burn at or near where the clip is located.

In another embodiment, where the tissues, organs, or organ systems described herein reside on a conductive tray, such as a metal tray, a piece of conductive tape can be adhered to the tray. An alligator clip, adhesive pad, or other connective device attached to the wire can then be adhered to the conductive tape. Examples of conductive tapes include, but are not limited to, stainless steel tape, copper tape, silver tape, aluminum tape, and carbon fiber tape.

The pH of the compositions is preferably within one pH unit of the normal blood pH, which is around a pH of 7.4.

In some embodiments, it can be desirable to include a detergent, such as a cationic, anionic, non-ionic, or zwitterionic surfactant, in an amount suitable to allow the fake blood to be more easily removed from clothing than if the detergent is not present.

Suitable nonionic surfactants include any of the conventional nonionic surfactant types typically used in liquid detergent products. These include alkoxylated fatty primary alcohol-based or secondary alcohol-based surfactants and amine oxide surfactants. In one aspect, for use in the liquid detergent products herein are those nonionic surfactants which are normally liquid.

The amount of detergent is typically less than around 1% by weight of the composition (dry weight), but the amount can be adjusted as desired.

In those embodiments where the composition includes a detergent, it is also preferable to include a suitable defoamer. Otherwise, as the blood composition is pumped through organs in a simulated surgical procedure, the blood can foam undesirably. The defoamers are typically present in a concentration of between around 0.01 and 2 by weight of the composition (dry weight).

Preservatives and/or antioxidants can also be present, in an amount sufficient to extend the useful shelf life of the composition.

In some embodiments, the fake blood formulations be within 20% of the osmolality of normal blood. Solutions/dispersions which have substantially the same osmolality of blood are isotonic. Solutions/dispersions which contain fewer particles and exert a lower osmotic pressure than 0.9% saline are called hypotonic, and those exerting higher osmotic pressures are referred to as hypertonic. The "clinical" significance of all this is to insure that isotonic or iso-osmolar solutions do not damage the animal or human tissue in the organs used in the simulated surgical systems. The pH of the compositions is preferably within one pH unit of the normal blood pH, which is around a pH of 7.4.

Clotting agents, if present, can be provided as a solution, dispersion, paste, spray, powder, and the like. Several clotting agents are commercially available, and can be included in a fake blood "kit" in their commercial form. Similarly, clot dissolving agents can be provided as a solution, dispersion, paste, spray, powder, and the like. In use, they are can be added to the blood compositions, or introduced via injection into an IV bag.

Use of Cassettes/Mannequins in Simulated Surgery

In use, the cassettes, which are adapted to fit inside a mannequin, are inserted into a mannequin, and the surgeon then practices surgery on the tissue within the cassette.

Where the tissue comprises porcine tissue blocks that include two or more, preferably three or more, more preferably four or more, and most preferably, all of the lungs, heart, aorta, esophagus, diaphragm, stomach, duodenum, liver, and spleen, but does not include the small intestine or bowel, the types of operations are typically operations performed on a patient's foregut. When the tissue further comprises small intestine or bowel, this allows for additional types of surgeries, as discussed herein. Where the esophagus is present, the surgeon can enter the stomach through the esophagus to perform additional types of operations relative to when the esophagus is not present.

Representative procedures which can be performed when the small bowel is included include small bowel resection, surgery to remove tumors from the small bowel, surgery to remove bowel obstructions and/or adhesions, colectomy, stricture-plasty, lateral internal sphincterotomy, ligation, transanal endoscopic microsurgery, anoplasty, bowel diversion, colostomy and polypectomy.

Where the small bowel is adhered to the plate by drilling two or more holes in the plate, and suturing the small bowel to the plate and/or adhering the small bowel to the plate with an adhesive, such as caulk or glue, this model re-creates the ligament of Treitz, thus allowing a user to measure and choose the appropriate site for division of the small bowel and creation of the gastric limb and entero-enterostomy. As such, it can be present in a surgeon training apparatus comprising a mannequin and a cassette of this embodiment, comprising a segment of the small bowel. The apparatus can be used, optionally where the mannequin is present on an operating table, in methods of simulating a gastric bypass operation.

In any of the embodiments described herein, the cassette can also include a porcine ureter and/or one or more blood vessels selected from the group consisting of the abdominal aorta, the main celiac trunk or its major branches, gastro-epiploic vessels and mesenteric vessels. In one aspect of these embodiments, one or more luer tipped catheters can be introduced into one or more of the porcine ureter and/or one or more blood vessels. A means for providing pulsatile perfusion of real and/or fake blood through the one or more blood vessels or porcine ureter can also be present. In this manner, the cassette can be used in methods of simulating vessel sealing exercises, wherein one or more blood vessels in the surgical system is cut, and the physician can practice sealing the cut vessel, for example, using sutures, staples, and/or electrocautery.

In any of the embodiments described herein, the cassette can also include a native porcine aorta (descending aorta), and used in methods of simulating aortic pulsation without perfusing blood, by placing a balloon in the porcine aorta, and inflating and deflating the balloon at a rate of between about 60 and about 80 times per minute.

In any of the embodiments described herein, the cassette can also include a length of en bloc porcine esophagus comprising one or more vagus nerve segments. The vagus nerve segments can allow for simulations that include the performance of anastomosis of the distal esophagus to the stomach or small bowel. For example, the cassettes can be used in methods of simulating esophagogastrectomy, and total gastrectomy, whether by traditional laparoscopic or robotic assisted methods.

An en bloc esophagectomy is an esophagectomy procedure. During this procedure, the doctor takes out the esophagus, a portion of the stomach, and all of the lymph nodes in the chest and abdomen. The surgery is performed through the neck, chest, and abdomen. The doctor reshapes the remainder of the stomach and brings it up through the chest to replace the esophagus. A radical en bloc esophagectomy can be used, for example, to treat a potentially curable tumor. Accordingly, in some embodiments, one or more of the organs in the organ block comprises a real or simulated tumor.

Robotic Surgery

In the simulated surgical procedures described herein, one or more surgeons can perform surgery on the animal tissue, organs, and/or organ blocks using robotic surgical instruments. Typically, the robotic surgical devices include one or more arms, which control one or more tools, such as an endoscope (which provides the surgeon with the ability to see inside of the patient, and, typically, a tool selected from the group consisting of jaws, scissors, graspers, needle holders, micro-dissectors, staple appliers, tackers, suction irrigation tools, clip appliers, cutting blades, cautery probes, irrigators, catheters, suction orifices, lasers, and lights.

In robotically-assisted telesurgery, the surgeon typically operates a master controller to control the motion of surgical instruments at the surgical site from a location that may be remote from the surgical simulator (e.g., across the operating room, in a different room, or a completely different building from the surgical simulator).

The master controller usually includes one or more hand input devices, such as handheld wrist gimbals, joysticks, exoskeletal gloves or the like. These control the movement of one or more of the robotic arms. Occasionally, line-of-sight/gaze tracking and oral commands are used to control movement of one or more of the robotic arms, and/or the audio/video components that transmit signal back to the surgeon.

For minimally invasive surgical procedures, the surgical instruments, controlled by the surgical manipulator, can be introduced into a simulated body cavity through a single surgical incision site, multiple closely spaced incision sites on the simulated body, and/or one or more natural orifices in the anatomy of the organ and/or organ block (such as through the rectum where a porcine or other animal gastrointestinal system is used as the organ block).

For some minimally invasive surgical procedures performed through particularly small entry ports, multiple surgical instruments may be introduced in a closely gathered cluster with nearly parallel instrument shafts.

A more detailed explanation of certain the components of robotic systems is provided below:

A robotic surgical system includes a master system, also referred to as a master or surgeon's console, for inputting a surgical procedure and a slave system, also referred to as a patient-side manipulator (PSM), for robotically moving surgical instruments at a surgical site within a patient. The robotic surgical system is used to perform minimally invasive robotic surgery. One example of a robotic surgical system architecture that can be used to implement the systems and techniques described in this disclosure is a da Vinci®. Surgical System manufactured by Intuitive Surgical, Inc. of Sunnyvale, Calif. Alternatively, a smaller scale robotic surgical system with a single manipulator arm may be suitable for some procedures. The robotic surgical system also includes an image capture system, which includes an image capture device, such as an endoscope, and related image processing hardware and software. The robotic surgical system also includes a control system that is operatively linked to sensors, motors, actuators, and other components of the master system and the slave system and to the image capture system.

The system is used by a system operator, generally a surgeon, who performs a minimally invasive simulated surgical procedure on a simulated patient. The system operator sees images, captured by the image capture system, presented for viewing at the master system. In response to the surgeon's input commands, the control system effects servo-mechanical movement of surgical instruments coupled to the robotic slave system.

The control system includes at least one processor and typically a plurality of processors for effecting control between the master system, the slave system, and the image capture system. The control system also includes software programming instructions to implement some or all of the methods described herein. The control system can include a number of data processing circuits (e.g., on the master system and/or on the slave system), with at least a portion of the processing optionally being performed adjacent an input device, a portion being performed adjacent a manipulator, and the like. Any of a wide variety of centralized or distributed data processing architectures may be employed. Similarly, the programming code may be implemented as a number of separate programs or subroutines, or may be integrated into a number of other aspects of the robotic systems described herein. In one embodiment, control system may support wireless communication protocols such as Bluetooth, IrDA, HomeRF, IEEE 802.11, DECT, and Wireless Telemetry.

The robotic surgical system can also include an instrument chassis that couples to the slave system. The instrument chassis provides a common platform for coupling surgical instruments and endoscope for introduction into an entry point on the simulated patient. In one embodiment, the entry point can be a mouth, where access to the throat or larynx is desired, the rectum where access to the gastrointestinal system, or, more particularly, to the colon, is desired, or previously-prepared or surgically created openings or orifices.

In one embodiment, the system can also include an instrument chassis having a proximal section and a distal section. The chassis supports an endoscope. Generally, the dimensions and shape of the chassis at its distal section are typically reduced compared to its proximal end, to minimize the volume of the surgical equipment near the surgical entry point. Instrument interfaces can be movably mounted to the proximal section of the instrument chassis. Surgical instruments can be mounted at the proximal end to the instrument interface. Surgical instruments can be mounted at its proximal end to the instrument interface. The interface drives movable components in the surgical instrument as described in U.S. Pat. No. 6,491,701 which is incorporated by reference herein, in its entirety. The interface drives the instrument in a similar way. The surgical instruments are also movably coupled to the distal section of the chassis. The instrument interfaces are mounted to the proximal section of the chassis such that rotational and linear motion is permitted. Specifically, an instrument interface mounting or a flexible instrument shaft permits a pitch motion of the instrument interfaces relative to the chassis, a yaw motion of the instrument interfaces relative to the chassis and an insertion sliding motion of the instrument interfaces relative to the chassis. The system can function in a manner similar to the manner in which chopsticks operate, in that small motions at the proximal end of the tool, near a pivot location, can correspond to larger motions at the distal end of the tool for manipulating objects.

An actuation system operates the components of instrument, such as an end effector and various wrist joints. An actuation system operates the components of instrument, such as an end effector and various wrist joints. The actuation systems can include motors, actuators, drive systems, control systems, and other components for effecting controlling the instruments. An interface actuation system controls the movement of the instrument with respect to the chassis, and an interface actuation system controls the movement of the instrument with respect to the chassis. The surgical system can be configured to manipulate one, two, or more instruments.

Some robotic surgery systems use a surgical instrument coupled to a robotic manipulator arm and to an insertion linkage system that constrained motion of the surgical instrument about a remote center of motion aligned along the shaft of the surgical instrument and coincident with a patient entry point, such as an entry incision. Further details of these methods and systems are described in U.S. Pat. Nos. 5,817,084 and 6,441,577, which are incorporated by reference herein in their entirety.

Actuators can be operably coupled to interface discs. A more detailed description of the interface discs and their function in driving a predetermined motion in an attached surgical instrument is fully described, for example, in U.S. Pat. No. 7,963,913, filed Dec. 10, 2006, disclosing "Instrument Interface of Robotic Surgical System," which is incorporated by reference herein in its entirety.

Various embodiments of surgical instruments, end effectors, and wrist mechanisms are explained in detail in U.S. Pat. Nos. 5,792,135; 6,331, 181; and 6,817,974, which are incorporated by reference herein in their entirety.

Switching from Robotic Surgery to Manual Surgery

One drawback of using robotic surgery is that instruments may need to be quickly removed when there is a "bleeder." Conventional surgical techniques may be required to find the source of the bleed, and close the bleed, before the rest of the surgical procedure can be performed. This can be difficult to practice, as it can be difficult to pre-program when a bleed will occur.

In one aspect of the invention, one or more of the tissues, organs, or organ blocks includes a porcine ureter and/or one or more blood vessels selected from the group consisting of the abdominal aorta, the main celiac trunk or its major branches, gastroepiploic vessels and mesenteric vessels. One or more luer-tipped catheters is introduced into one or more of the porcine ureter and/or one or more blood vessels, and real and/or fake blood is perfused through one or more blood vessels, or through the porcine ureter. In this manner, the cassette can be used in methods of simulating vessel sealing exercises. In one embodiment, the surgeon cuts the vessel during the simulated surgery, and then has to repair the cut vessel. In another embodiment, one or more blood vessels in the surgical system is cut before surgery, but a clot is present, and the clot impedes the flow of blood. Once the clot is dissolved, the cut vessel "bleeds," and the physician has to repair the cut. The surgeon can seal the cut vessel, for example, using sutures, staples, and/or electrocautery.

In one aspect, animal blood, human blood, or the artificial blood compositions described herein is clotted using a clotting agent, and the clot is present in the vessel. The clot is dissolved during the simulated surgical procedure when the blood compositions, which, in this embodiment, contain an anti-clotting agent, are in sufficient contact with the clot to dissolve the clot. In another aspect of the invention, an anti-clotting agent is introduced, for example, into an IV bag, to cause the clot to dissolve.

When the clot dissolves, the surgeon using a robotic surgical apparatus either has to fix the resulting "bleeder" using the robotic surgical apparatus, or remove the apparatus from the patient, and go in manually to fix the bleeder.

Accordingly, in this embodiment, the simulated surgical systems can provide a more realistic experience than those in which there is never the possibility of having a bleeder.

The present invention will be better understood with reference to the following non-limiting examples.

Example 1: Simulated Surgical Models

FIG. 1 is a schematic illustration of an embodiment of a mannequin (20) adapted to receive the foregut tissue model. A tube (10) is adapted to be placed in the esophagus of the organ system. As discussed elsewhere herein, this tube (10) can be used to pass surgical tools through the esophagus into the gastrointestinal tract, and/or to inflate the lungs. No organ systems, or cassettes including the organ systems, are shown, but there is a space shown (a simulated abdominal cavity (90) which is adapted to receive a cassette which includes the organ systems.

The plate (60) includes a series of holes (110) to provide a means for attachment to the mannequin (20). A connection means (100) on the plate (60) allows the plate (60) to be adhered to the mannequin (20), for example, using a bolt (as shown), though other means of attachment, such as screws, bungee cords, rope, Velcro®, and the like, can also be used.

In addition to the plate (60) including holes for adhering the plate (60) to the mannequin (20), in this embodiment, the plate also includes additional holes (120) which can be used for mechanically adhering one or more organs to the plate (60). In one embodiment, the small bowel is adhered to the plate (60) by through two or more holes in the plate (60), for example, via suturing, although in other embodiments, the small bowel can be adhered to the plate (60) with an adhesive, such as caulk or glue.

The plate (60) lies within the simulated abdominal cavity (90), and a hoop (30) is adhered both to the plate (60), in this embodiment, using string, and to the mannequin (20), using a bungee cord (50). In use, as shown in FIG. 3, the organ system is adhered to the plate, the organ system is mechanically attached to the hoop (30), and the tube (10) is placed in the esophagus.

Figure 2:
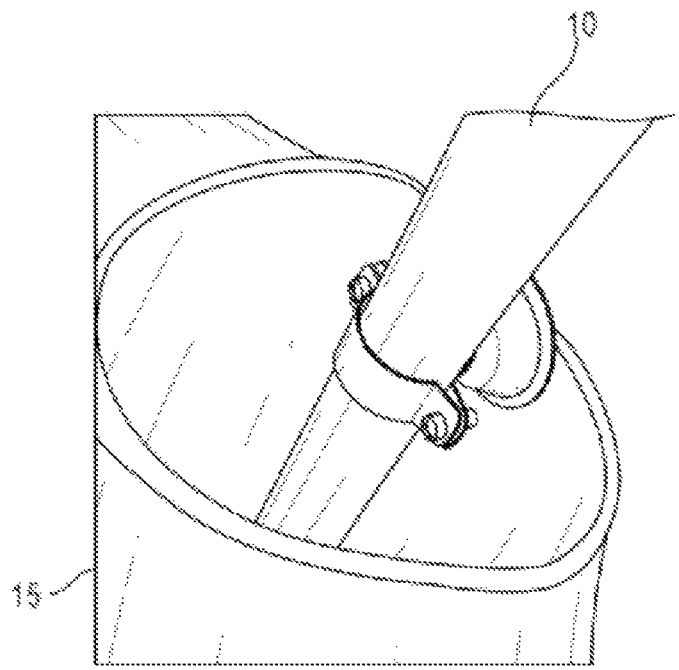
FIG. 2 is a schematic illustration of a representative embodiment of a foregut tissue model, where a tube is placed in the esophagus.

FIG. 2 is a schematic illustration of a representative embodiment of a foregut tissue model, where a tube (10) is placed in the esophagus (15).

Figure 3:
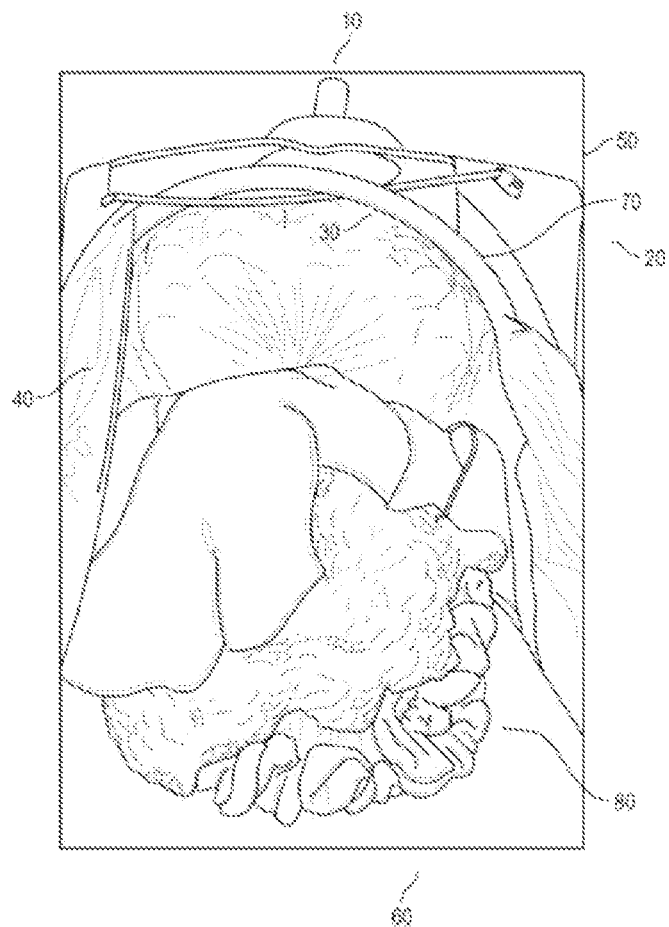
FIG. 3 is a schematic illustration of a representative embodiment, wherein the tissue block includes the lungs, small intestine, bowel, and esophagus, tubing is present in the esophagus, and a bag is placed between the tissue and the simulated abdominal cavity, so as to allow for easy cleanup and tissue disposal.

FIG. 3 is a schematic illustration of a representative embodiment of a cassette comprising a series of organs (80), including the lungs, small intestine, bowel, and esophagus, with tubing (10) present in the esophagus, adhered to a plate (60) and inserted into a mannequin (20), such as the mannequin of FIG. 1. The cassette is inserted into a simulated abdominal cavity on a mannequin (20), where a bag (40) is placed between the tissue (80) and the simulated abdominal cavity (not shown, as it is covered by the plastic bag). At the angle of this illustration, only the edges of the plate (60) are shown, as the adhered tissue overlies the remainder of the plate.

The cassette comprises a collapsible hoop (30) to suspend the porcine diaphragm. The porcine diaphragm can be suspended anteriorly, for example, by physically attaching, or chemically adhering, the organs (80) to the collapsible hoop (30). As shown in FIG. 3, the organ (80) is adhered to the hoop (30) via a wire (70) that perforates the tissue (80) and wraps around the hoop (30). The collapsible hoop (30) can be secured to the plate (60) or the mannequin (20), for example, using bungee cord (50). In FIG. 3, the hoop (30) is secured to the mannequin (20) using bungee cord (50).

Figure 4:
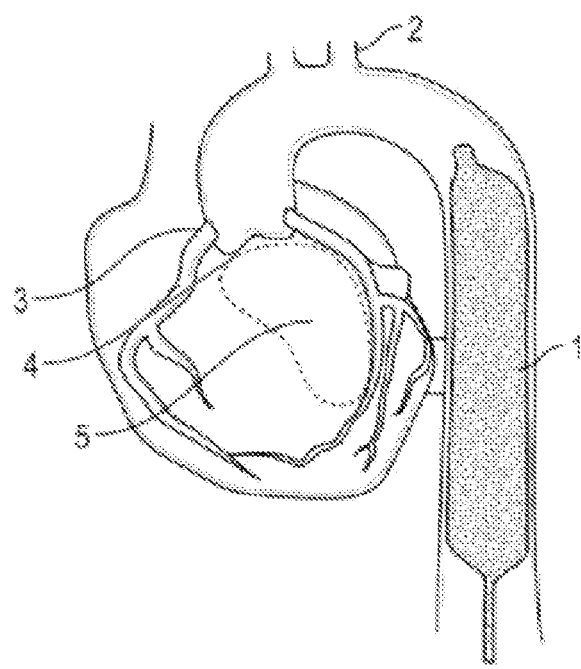
FIG. 4 is a schematic illustration of a heart, where a balloon is inserted into the aorta.

FIG. 4 is a schematic illustration of a heart with a balloon (1) inserted into the left subclavian artery (2). Also shown is the coronary artery (3), the aortic valve (4) and the left ventricle (5).

Figure 5:
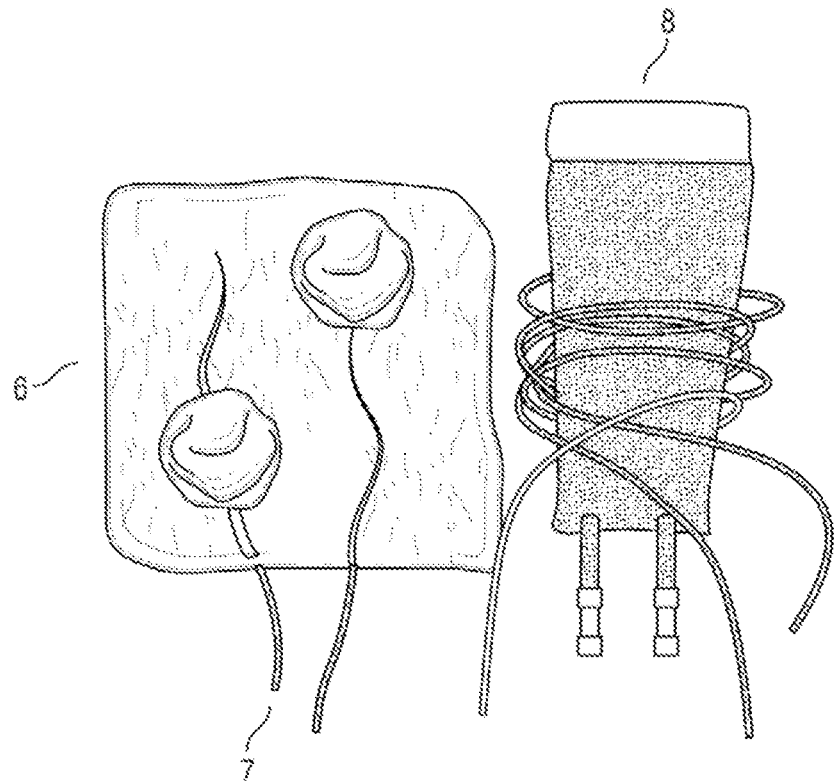
FIG. 5 is a schematic illustration of tissue connected, via tubing, to an IV bag filled with fake blood, where the fake blood can perfuse through the tissue.

FIG. 5 is a schematic illustration showing tissue (6) connected via tubing (7) to an IV bag (8) filled with fake blood. In this embodiment, fake blood can be perfused through the tissue. In this embodiment, the tissue is adhered to a plastic plate, which is not shown, as it is underneath the tissue and therefore not visible.

Figure 8:
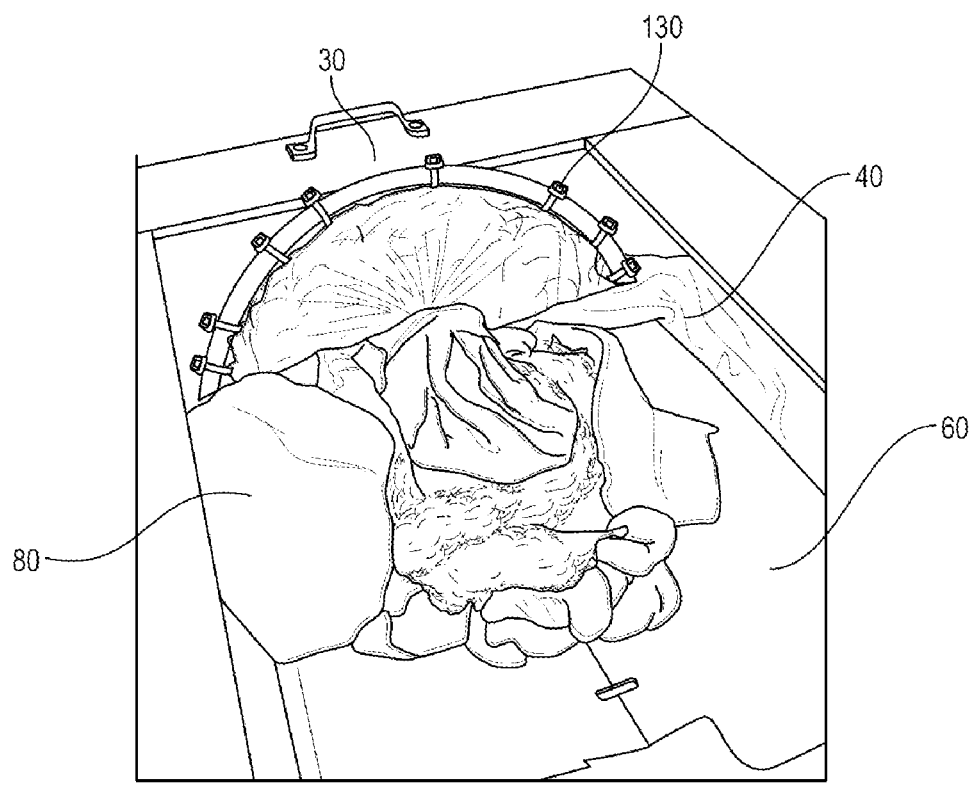
FIG. 8 is a schematic illustration of one embodiment of the cassette described herein, showing tissue adhered to a hoop using zip ties which go through holes in the tissue, then around the hoop. The tissue overlies a plate, which overlies a plastic bag.

FIG. 8 is a schematic illustration showing tissue (80) adhered to a hoop (30) using zip ties (130) which go through holes in the tissue, then around the hoop (30). The tissue (80) overlies a plate (60), which overlies a plastic bag (40). Adhering the tissue (80) to the hoop (30) in this manner supports the diaphragm.

Figure 9:
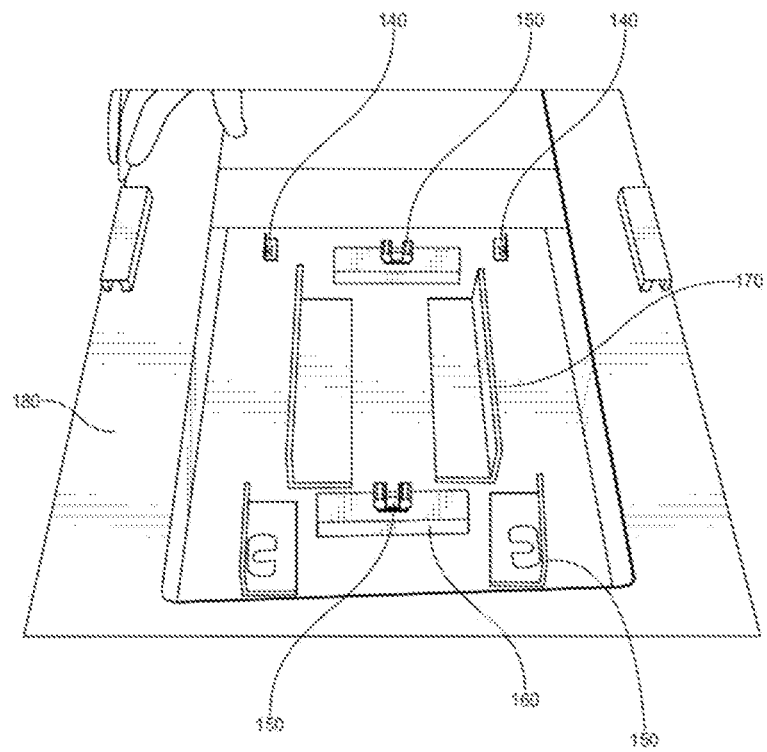
FIG. 9 is a schematic illustration showing one embodiment of a tray, which includes clips to which a plate (not shown in this figure) can be attached.

FIG. 9 is a schematic illustration showing an embodiment of a tray (180) to which a plate (not shown in this figure) can be attached. The plate, when combined with tissue, organs, or organ systems, forms a "cassette." The tray is shown with various attachment methods for attaching the tray to a mannequin, as well as to a hoop. The various components are shown in this schematic illustration from the top to the bottom of the schematic illustration, such that the top of the image is the foot of the model, and the bottom (near side) is the head.

Two slots (140) are cut in the bottom of the tray to allow a strap to pass through which will attach the tray to an operating table, a mannequin, or another surface. These slots are duplicated at the head end of the tray.

A spring clip (150) is installed on a piece of 1" aluminum tube (160) to receive the spine of the plate. A spring clip is used so a disposal bag can be inserted below the plate without puncturing the bag. The height of the aluminum tube can vary depending on the shape of the plate to be attached to the tray. A second clip on tube is installed near the head end. Two pieces of 2" aluminum angle, the height of which can similarly vary, are installed near the middle of the tray to support the plate. Again the height of these is somewhat arbitrary. Two pieces of 1½" aluminum angle (170) are installed near the head. The angle includes spring clips (150) to receive the hoop supporting the diaphragm.

Figure 10:
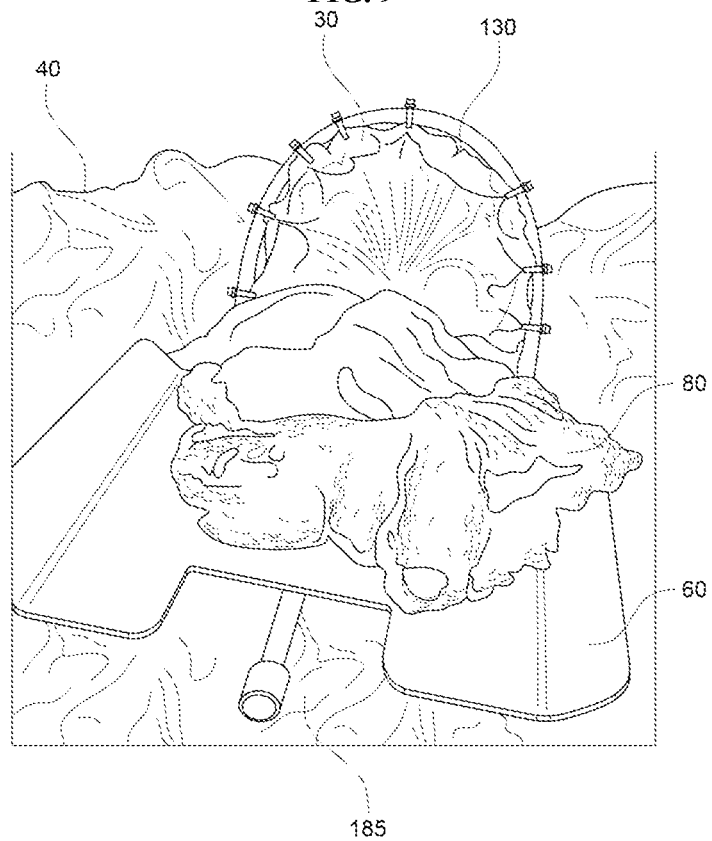
FIG. 10 is a schematic illustration showing tissue on a plate, where the plate includes a central spine which can be clipped in to the clips shown in FIG. 9.

FIG. 10 is a schematic illustration showing tissue (80) on a plate (60) from a different perspective. The plate includes a central spine (185), which can be clipped in to the clips (150) shown in FIG. 9. In this embodiment, a bag (40) lies under the plate (60), and, when the plate (60) is clipped to the tray (shown in FIG. 9), the bag can facilitate cleanup following the simulated surgical procedure. The tissue is also adhered to a hoop (30), using zip ties (130) to support the diaphragm.

Figure 11:
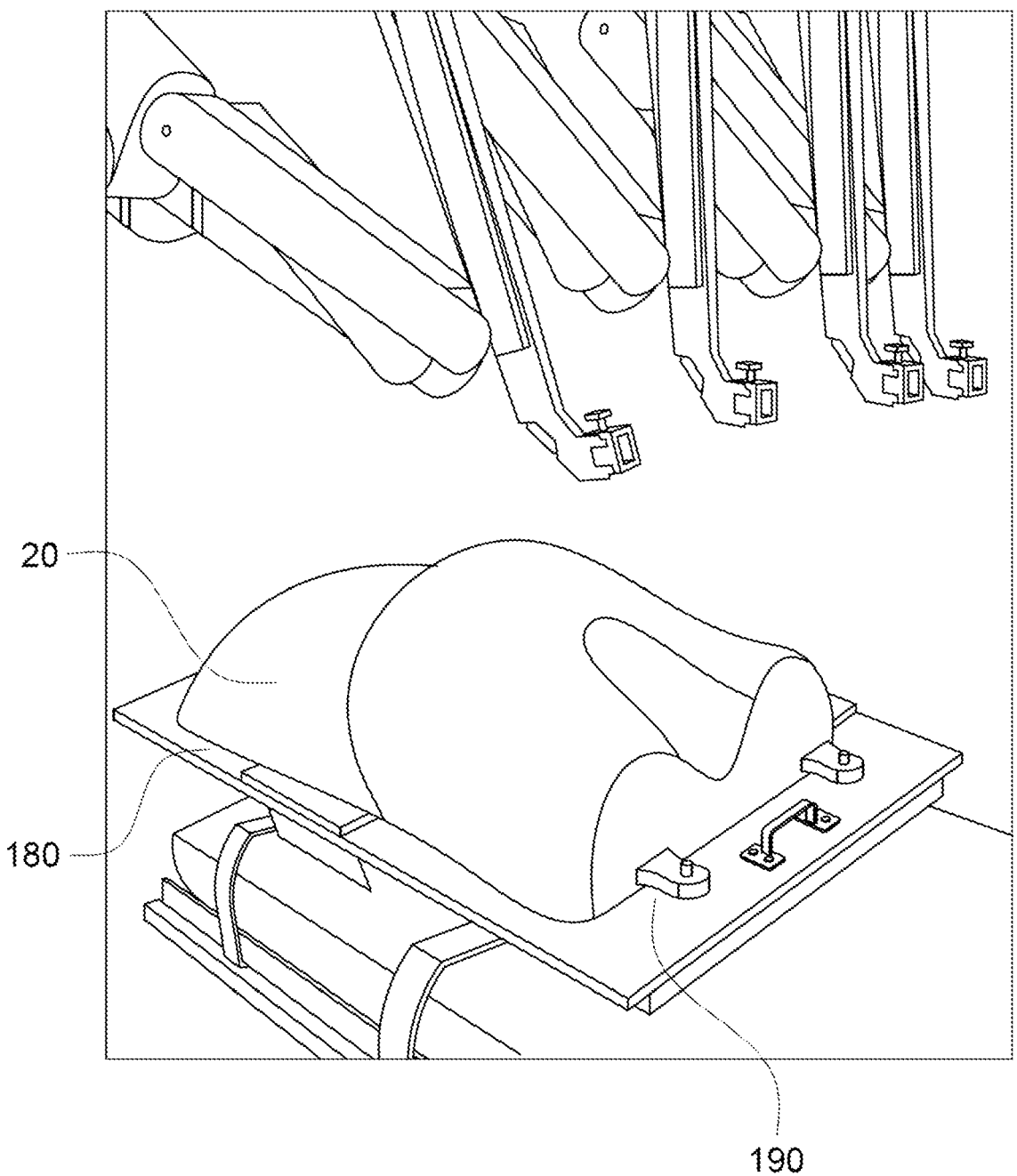
FIG. 11 is a schematic illustration showing one embodiment of a mannequin attached to a tray.

FIG. 11 is a schematic illustration showing one embodiment of a mannequin (20) attached to a tray (180) using clips (190). Not shown in this schematic illustration is the plate, adhered to the tray, the tissue, organs, or organ systems attached to the plate, the hoop attached to the tissue and to the tray, the mannequin, and/or the plate, all of which lies between the tray and the mannequin.

Figure 6:
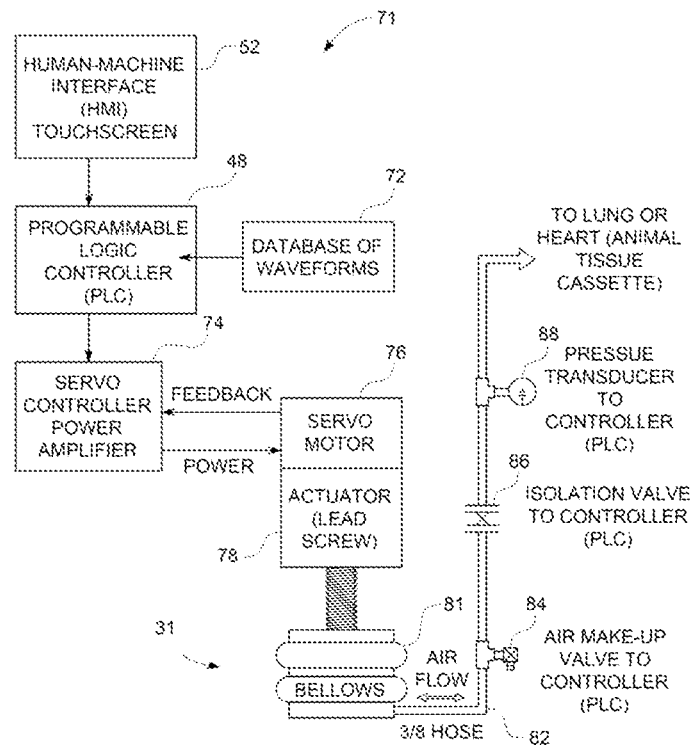
FIG. 6 is a schematic illustration of a system for simulating breathing and/or a heartbeat.

FIG. 6 is a schematic illustration of a means for providing the simulated tissue/organs/organ systems described herein with a simulated heartbeat and/or simulated breathing. As disclosed in U.S. Publication No. 20170294146, one embodiment of an inflation/deflation system 71 includes the controller 48 that interoperates with a memory 72 having a database of waveforms, which preferably reside in a non-volatile memory such as on a memory board or card and is assessed by the controller as a programmable logic controller (PLC) in this example. For heartbeats, these waveforms approximate EKG traces. With the lung functions, including coughs and sneezes, these waveforms approximate audio frequency recordings of the sound made during a cough or sneeze.

The inflation/deflation system (71) may also include a server-controller power amplifier 74 as a high-power analog audio frequency amplifier and a servomotor 76 that includes a feedback loop between the signal fed to the amplifier and actual motion of the servomotor. The servomotor 76 may draw power from the amplifier in direct proportion to the waveform that it is being tasked to reproduce. The actuator 78 may be formed as a high speed, low-latency lead screw to convert rotational motion to linear motion and it be attached to a bellows 81 as part of the inflator 31 such as described above and further described in the incorporated by reference patent applications identified above. The bellows 81 outputs air via an air hose connection to an air hose 82 such as ⅜ hose or tube that eventually connects to a balloon placed in the porcine heart or directly to the windpipe or bronchus of the porcine lungs. The controller (PLC) 48 controls operation of the different types of valves that open when needed to begin a "breathing" and cardiac cycle. An air make-up valve 84 may be connected to the air hose 82 and isolation valves 86 may be formed as a liquid trap in a HEPA filter that prevents potentially contaminating residual porcine liquids from entering the inflator 31 and/or bellows 81 and allowing the mechanical and electrical components to decompose. The system may shut down if liquid is detected. Pressure transducers 88 provide an accurate pressure reading to the controller or PLC 48 and operate to help size the heart and lungs and prevent overfilling while scaling the waveforms. The system may include "quick connect" fittings as known to those skilled in the art to connect a hose from any pumps to the driven organ.

Inflation and deflation of lungs of a real patient causes the rise and fall of the mediastinum. To simulate this, an appropriate volume of air or some other fluid can be used to inflate and deflate an appropriately sized and placed container hidden under the tissue to be animated with movement. For example, a respiration rate of 20 breaths per minute can be simulated by periodically expanding an air bladder such as a whoopee cushion, or an empty one-liter IV bag that is folded in half.

Rather than merely animating the tissue by causing it to rise and fall, it is possible to connect lungs to a source of gas, such as air or nitrogen, and cycle the air going into and out of the lungs in such a way as to mimic respiration. For example, a bellows or an "Ambu bag," can be used to provide a "pulsatile" air supply. A suitable arrangement is described, for example, in U.S. Publication No. 2013/0330700, the disclosure which is hereby incorporated by reference in its entirety, and may be used with a surgeon training apparatus. In one embodiment, a surgeon training apparatus comprises a simulated tissue/organ/organ system (i.e., a cassette) as described herein, and a mannequin, where the cassette is disposed within the mannequin.

In one embodiment, from one to four balloons are placed within from one to four ventricles (typically with only one balloon per ventricle). The inflation and contraction of the balloon replicates a heartbeat. Anywhere from one to four balloons can used, in anywhere from one to four ventricles, depending on the type of surgery to be simulated. The balloons are inflated with air, and allowed to deflate. The inflation and deflation of the balloons causes real or fake blood to circulate through the simulated "patient," or at least those parts of which that are exposed to the surgeon undergoing training.

By placing the balloon(s) inside of the ventricles, it is possible to reproduce reasonably and accurately the movement of the heart. The inflation of the balloon causes active expansion, and the deflation of the balloon causes passive contraction.

The addition and removal of a gas to the balloon can be controlled using the same mechanisms for moving a gas into and out of the lungs, except that the gas is moved in and out of a balloon, which has been placed inside the heart, rather than in the lungs.

In operation, the overall system 71 as used for inflating the lungs or preparing the heart is shown in FIG. 6 and has been described generally before. The human-machine interface (HMI) 52 is equipped as a touch screen and connected to the programmable logic controller (PLC) 48 as the main controller, which includes or interoperates with the memory 72 having a database of suitable waveforms. These waveforms are used to simulate different types of breathing or different types of heartbeats. For example, a waveform can be used to simulate a normal heartbeat, cardiac arrest, various arrhythmias, and a flat-line (i.e., no pulse). Similarly, a waveform can be used to simulate normal breathing, shallow breathing, coughing, sneezing, sleep apnea, choking, and the like.

The controller as a PLC 48 is attached to the servo controller 74, which includes its power amplifier. The servo controller 74 sends power to the servomotor 76, which sends feedback signals to the servo controller 74. The servomotor 76 is connected to the actuator 78, which translates energy into linear motion in this non-limiting example. This can be, for example, a lead screw, ball screw, or rocker screw. There are a number of linear energy devices enabling pumping and other functions as known to those skilled in the art.

Electromechanical actuators, which use an electric motor, can be used. Machine screw actuators may be used to convert rotary motion into linear motion, and the linear motion may move a bellows up and down.

The bellows 81 may operate as part of the inflator 31 in this example and may be incorporated with the actuator 78 to transfer pressure into a linear motion, or linear motion into pressure, depending on whether a gas is being blown into the lungs or heart, or being removed from the lungs or heart. An edge welded bellows actuator may allow a long stroke, have excellent media compatibility, and permit high temperature and pressure capabilities. Edge welded bellows may also provide flexibility in design to fit size, weight, and movement requirements and allow the movement to be driven by internal or external forces. Bellows actuators may be used in valve applications, where pressure is internal or external to the bellows. Custom flanges, end pieces and hardware can be integrated into the assembly as appropriate.

In the illustrated example, the bellows 81 is attached to the appropriately-sized hose 82, typically between one-fourth and 1 inch in diameter, more typically ⅜ or one-half inch in diameter, which allows for the passage of a gas. The hose may pass through the air make-up valve 84, the isolation valve 86, and the pressure transducer 88, any and all of which can be connected to the controller 48 using techniques known to those skilled in the art. Once the appropriate pressure is attained, the gas can pass to the lung(s) and/or heart. The actuator 78, for example, the lead screw activator can be moved in one direction to fill the heart/lungs, and in the other direction to withdraw gas from the heart/lungs.

The inflation/deflation system is controlled via the controller 48, for example, a programmable logic controller as a single component, but it may in practice be distributed over several pieces of equipment. The controller 48 may provide umbilical cables to one or more pneumatic supplies. An example pneumatic supply may be a closed loop system where air flow passes into and back from the umbilical cables on a periodic basis. For example, to support a beating heart, one pneumatic supply line may have air that pulses into the pneumatic line at 78 beats per minute. Optionally, this rate may be adjustable and may be altered to simulate a heart that stops or goes into some form of distress. Inflatable elements may thus expand and contract as paced by the pulses of air. Having a closed system avoids situations where the heart or lung are over-filled. The amount of air provided by the pulse into the pneumatic line may be fine-tuned by the operator in order to adjust the simulation.

A pulsatile pump that better emulates a heartbeat than a sinusoidal oscillation of air in the pneumatic line may be included with the controller or it may receive pulsatile air from an external pulsatile pump. One suitable pulsatile pump is described in U.S. Pat. No. 7,798,815 to Ramphal et al. for a Computer-Controlled Tissue-Based Simulator for Training in Cardiac Surgical Techniques, the disclosure which is incorporated herein by reference in its entirety. Additional pneumatic supply lines at various target air pressures may be included in the umbilical cable. Any umbilical cable may include lines at ambient pressure (vented to ambient) or at a slight vacuum to allow expanded balloon-type structures to be emptied.

Figure 7:
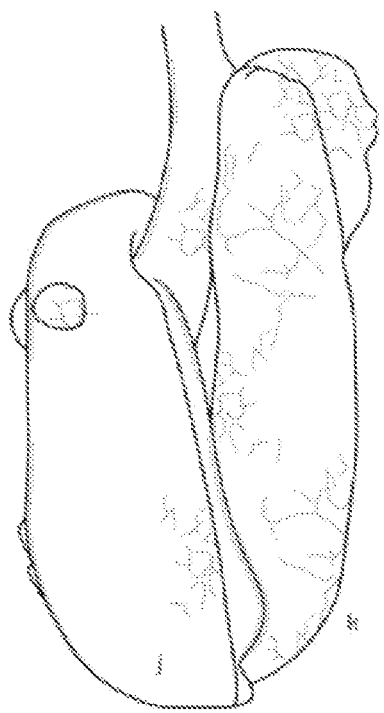
FIG. 7 is a schematic illustration of isolated lungs, into which a balloon (not shown) is inserted.

FIG. 7 is a schematic illustration which shows isolated lungs (j), into which a balloon (k, not shown, as it is inside the lungs) is positioned. Lungs with a balloon inserted therein can be used in accordance with the system shown in FIG. 6. In use, lung (j) is ventilated with the movement of a balloon (k) inside the lungs, as the balloon is inflated and deflated.

All references referred to herein are hereby incorporated by reference for all purposes.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A cassette comprising:
   a) biological tissue mimicking a foregut, and
   b) a plate to which the tissue is adhered, wherein:
   i) the plate is adapted to be connected to a mannequin, and to affix the tissue into a simulated anatomic framework that mirrors a human abdomen and/or foregut,
   ii) the biological tissue comprises porcine tissue blocks that include two or more of the lungs, heart, aorta, esophagus, diaphragm, stomach, duodenum, liver, and spleen.

2. The cassette of claim 1, wherein the biological tissue is adapted to be able to perfuse real or artificial blood.

3. The cassette of claim 1, wherein the tissue blocks comprise a means for simulating a pulse.

4. The cassette of claim 1, further comprising an esophageal conduit comprising a porcine esophagus, wherein the porcine esophagus is linked to the mannequin, and the esophageal conduit is adapted to allow for gastric intubation via nasogastric tube insertion and/or passage of esophageal dilators.

5. The cassette of claim 4, wherein the porcine esophagus is intubated with tubing, wherein the esophagus and tubing are physically secured and/or or chemically adhered together.

6. The cassette of claim 1, wherein the porcine tissue blocks comprise a diaphragm, and wherein the cassette further comprises a collapsible hoop to suspend the diaphragm,
   wherein the diaphragm is suspended anteriorly by physically attaching, or chemically adhering, the diaphragm to the collapsible hoop, and
   wherein the collapsible hoop is adapted to be secured to the plate or to a mannequin.

7. The cassette of claim 6, wherein the tissue blocks comprise a means for simulating a pulse.

8. The cassette of claim 6, wherein the biological tissue comprises lungs, and wherein the cassette further comprises a means for simulating respiration.

9. The cassette of claim 8, wherein the means for simulating respiration comprises pneumatic balloon insufflation.

10. A surgeon training apparatus comprising:
    a) a mannequin, and
    b) the cassette of claim 1.

11. The cassette of claim 1, wherein the biological tissue further comprises a length of porcine small intestine with intact mesentery, measuring between approximately 6 and approximately 8 feet in length.

12. The cassette of claim 1, wherein the biological tissue further comprises a segment of a small bowel, and wherein the segment of the small bowel is fixed to the plate.

13. The cassette of claim 12, wherein the small bowel is adhered to the plate by drilling two or more holes in the plate, and suturing the small bowel to the plate and/or adhering the small bowel to the plate.

14. The cassette of claim 12, wherein the model re-creates the ligament of Treitz, thus allowing a user to measure and choose the appropriate site for division of the small bowel and creation of the gastric limb and entero-enterostomy.

15. A surgeon training apparatus comprising:
    a) a mannequin, and
    b) the cassette of claim 12.

16. The surgeon training apparatus of claim 15, further comprising one or more of a) a disposable plastic bag placed beneath the tissue block and plate prior to placement in the mannequin, b) a silicone drape placed inside the mannequin to simulate the retroperitoneal background, c) a porcine ureter and/or one or more blood vessels selected from the group consisting of the abdominal aorta, the main celiac trunk or its major branches, gastroepiploic vessels and mesenteric vessels, d) a means for pulsatile perfusion of real and/or fake blood through the one or more blood vessels or porcine ureter, e) a silicone drape placed inside the mannequin to simulate the retroperitoneal background and improve fidelity during use of the model, f) a native porcine aorta, and g) a length of en bloc porcine esophagus comprising one or more vagus nerve segments.

17. The cassette of claim 16, wherein the surgeon training apparatus comprises one or more vagus nerve segments, and the one or more vagus nerve segments allow for simulations that include the performance of anastomosis of the distal esophagus to the stomach or small bowel.

* * * * *